Feb. 13, 1951 — E. L. DENNIS — 2,541,640
BICYCLE BASKET
Filed Sept. 22, 1949 — 2 Sheets-Sheet 1
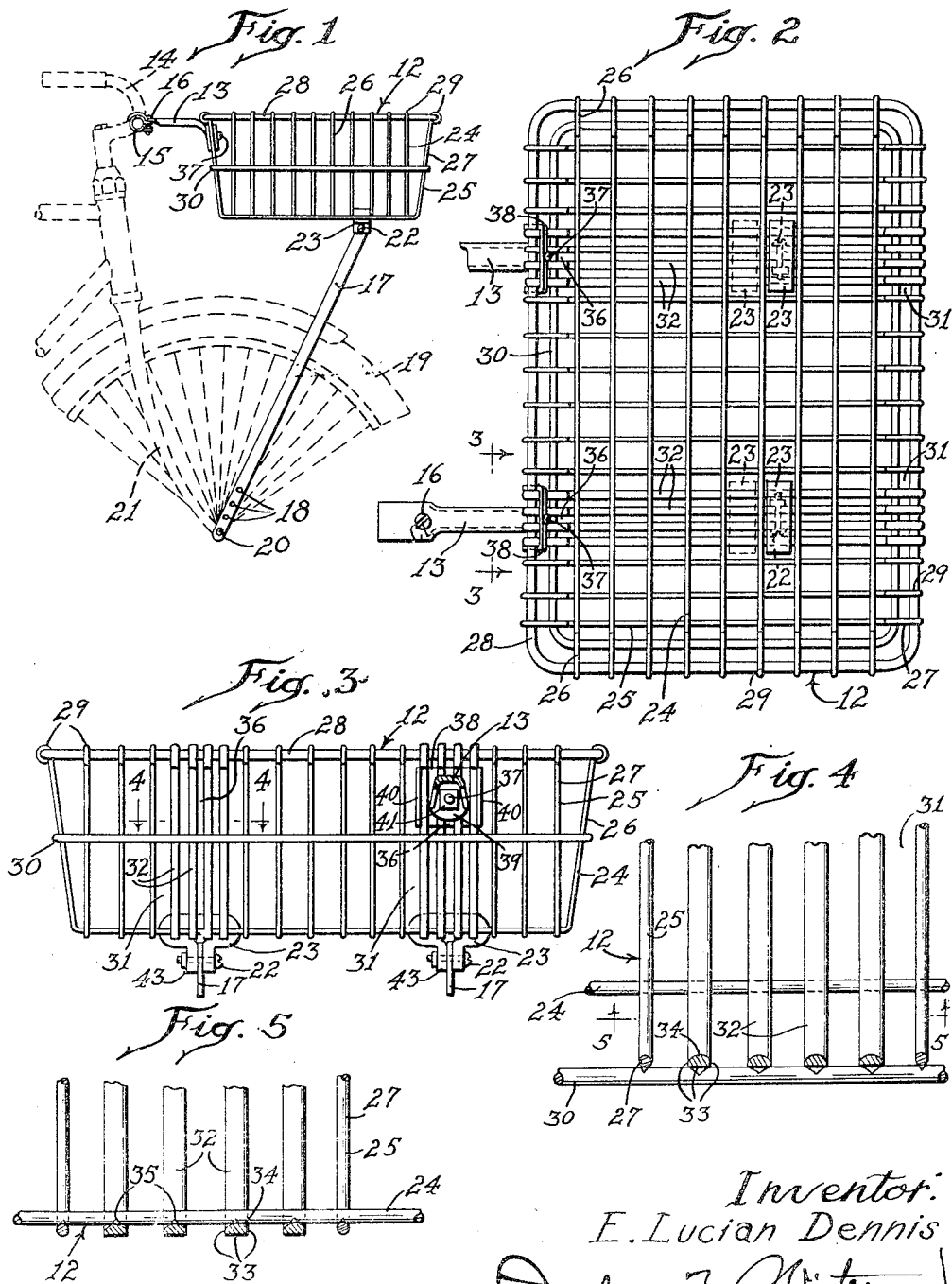
Inventor:
E. Lucian Dennis Feb. 13, 1951 E. L. DENNIS 2,541,640
BICYCLE BASKET
Filed Sept. 22, 1949 2 Sheets-Sheet 2
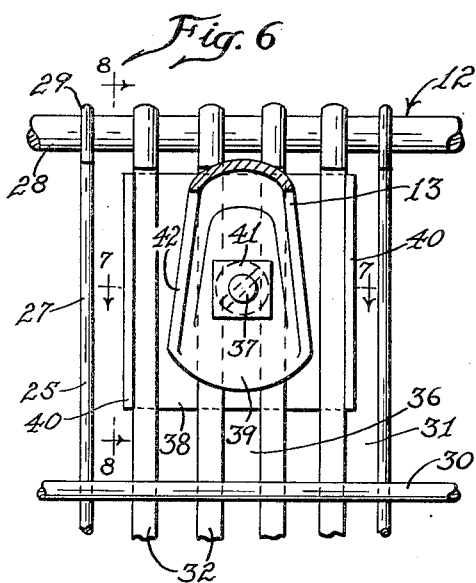
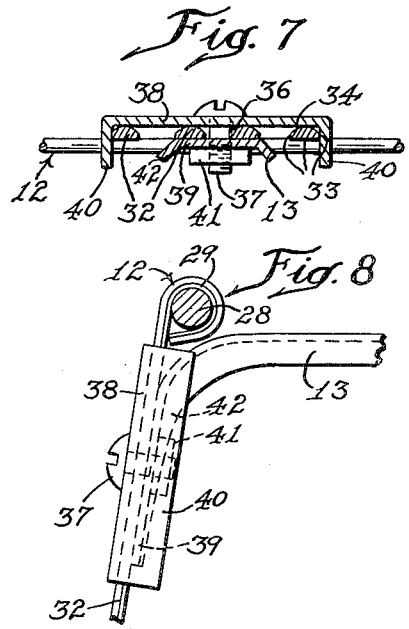
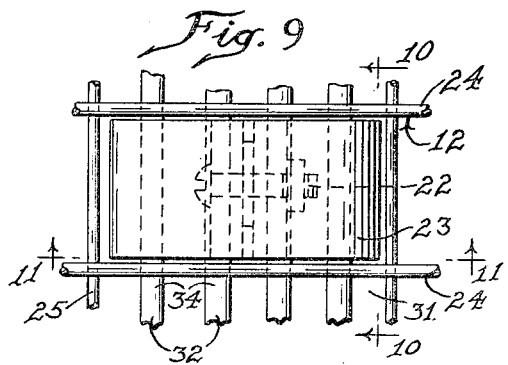
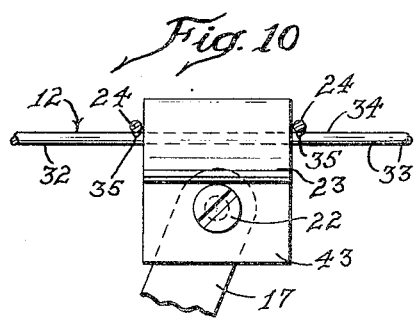
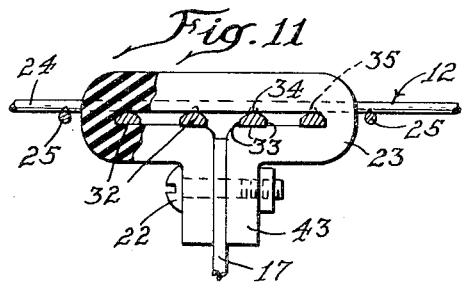
Inventor:
E. Lucian Dennis Patented Feb. 13, 1951

2,541,640

UNITED STATES PATENT OFFICE 2,541,640

BICYCLE BASKET

E. Lucian Dennis, Rockford, Ill., assignor to The Washburn Company, Worcester, Mass., a corporation of Massachusetts Application September 22, 1949, Serial No. 117,228

17 Claims. (Cl. 224—36)

1

This invention relates to bicycle baskets and is concerned with improvements both in the construction of the basket itself and in its mode of attachment at the back to the brackets that attach to the handlebar, and in its mode of attachment at the bottom to the two supporting arms that attach to the front axle of the bicycle.

Wide and definitely utilitarian appearing sheet metal straps or bands were used heretofore in the construction of wire bicycle baskets to provide sufficiently sturdy frame members on the basket to which to attach the brackets that attach to the handlebar and the bottom supporting arms, or the like, that attach elsewhere, as on to front axle. However, these sheet metal bands not only detracted from the appearance of the basket but were objectionable because, unless these sheet metal members had special weld projections struck therefrom, the wires on the bottom of the basket could not be spot-welded satisfactorily to these bands and, even despite such precautions, it was not uncommon for some of the welds to break, and, as a result, the bands became so loose that the basket was no longer supported properly and would rattle badly and get bent out of shape too easily and, hence, would require replacement sooner than expected. It is, therefore, one of the principal objects of my invention to provide, instead of each sheet metal band, a plurality of flattened wires that are heavier than the wires forming the rest of the mesh part of the basket and disposed in closely spaced parallel relation, thus presenting a much more pleasing appearance, these wires having convex faces that lend themselves nicely to spot-welding these wires in cross-wise relation to the round wires on the bottom of the basket, without any special preliminary operations being necessary. This construction not only produces a basket having much greater strength and durability, by reason of the large number of fairly closely spaced good welds, but the spaced parallel heavy wires afford the equivalent of slots that would otherwise have to be provided in the bands, so that the brackets adapted to be fastened onto the back of the basket and used to support the basket by attachment to the handlebar of the bicycle may, in the bolting of the brackets to the basket, be slidably adjusted up or down relative to these wires on the back of the basket for a nice fit of the basket on the handlebar. The parallelism of these heavier wires also enables sliding the parallel flanged edge portions of a washer along the same so that such washers used under the heads of the bolts are both slid-

2 able and positively held against turning in different positions of adjustment of the brackets.

Another object of my invention is to provide molded rubber C-clips formed to tightly embrace the groups of heavier wires between neighboring transversely extending wires in the bottom of the basket and each having thereon a pair of closely spaced downwardly projecting perforated ears or lugs on the ends of the C adapted to receive a bolt in registering holes provided therein for pivotally adjustably securing the clip to the associated one of a pair of supporting arms that is connected at its other end to the axle, whereby to obviate the necessity of using bolts in the fastening of the supporting means on the bottom of the basket, the heads of which would project from the bottom of the basket and be apt to come into harmful contact with articles placed in the basket, such bolts being also subject to loosening and, therefore, apt to drop out, leaving the basket without some much needed support. The rubber clips are, however, of even greater benefit from the standpoint that they provide sound-proof and vibration-absorbing connections between the supporting arms and the bottom of the basket. Here again, the construction affords the needed adjustability to adapt the basket to use on different sizes and makes and models of bicycles, because the clips may be moved from one location to another farther forward or rearward, depending upon the needs of a particular installation, thus also making it a simpler matter to alter the setting of the supporting arms relative to the basket when the handlebar is to be raised or lowered some time after the basket has been applied to a bicycle.

The invention is illustrated in the accompanying drawings, in which

Fig. 1 is a side view of a bicycle basket made in accordance with my invention and shown mounted on the front of a bicycle, which is indicated in dotted lines;

Fig. 2 is a plan view of the basket on a larger scale;

Fig. 3 is a rear view of the basket, with one handlebar bracket shown in cross-section on line 3—3 of Fig. 2, and the other one removed;

Figs. 4 and 5 are sectional details on lines 4—4 and 5—5 of Figs. 3 and 4, respectively, showing the parts about full size;

Fig. 6 is an enlargement to about full size of a portion of Fig. 3, to better illustrate the mode of fastening the handlebar brackets to the back of the basket;

Figs. 7 and 8 are sectional details on lines 7—7 and 8—8, respectively, in Fig. 6;

Fig. 9 is an enlargement to about full size of a portion of Fig. 2, to better illustrate the C-clip of molded rubber, and Figs. 10 and 11 are sectional details on lines 10—10 and 11—11, respectively, of Fig. 9.

The same reference numerals are applied to corresponding parts in these views.

The improved basket of my invention, indicated generally by the reference numeral 12, is shown supported at the rear thereof by two sheet metal brackets 13 that rest on and are fastened to the handlebar 14 by clamping bands 15, similarly as disclosed in my earlier Patent 2,010,479, these bands being tightenable onto the handlebar and bracket by bolts 16. Two sheet metal arms 17 that have holes 18 provided in spaced relation in their lower end portions are disposed on opposite sides of the front wheel 19 and receive the end portions of the front wheel axle 20 in selected holes, so that when the usual nuts are applied to the axle and tightened to fasten the axle to the fork 21 the arms are also fastened securely. The arms 17 extend upwardly, as shown, and are secured at their upper ends by means of bolts 22 onto clips 23 on the bottom of the basket, whereby to support the same on the front axle. The basket, so supported, is adapted for use in carrying packages in the usual way.

The basket 12 is made entirely of wire, round wires 24 extending in parellel relationship longitudinally of the basket and welded at the intersection points to round wires 25 that are disposed in parallel relationship to one another but crosswise relative to wire 24, in a fore and aft direction, the end portions 26 of wires 24 being bent upwardly to form the end walls of the basket, and the end portions 27 of wires 25 being bent upwardly to form the front and back walls of the basket. The wires 24 and 25 are fairly small in diameter in relation to the rectangular top frame 28 made of heavy round wire, onto which the ends of the wires 24 and 25 are looped and clinched, as indicated at 29. Another rectangular wire frame 30, made of a medium sized round wire, is welded to the outer sides of the bent up end portions 26 and 27 forming the four side walls of the basket. The basket, to this extent, is like many others. Now, in accordance with my invention, instead of fastening wide and rather unsightly, and, as previously stated, otherwise objectionable, sheet metal straps or bands onto the basket, onto which to fasten the basket supporting brackets, as disclosed, for example, in my Patent 2,010,479, I leave two wide open spaces 31 between the fore and aft extending wires 25, in each of which spaces is located a plurality of spaced, parallel, fairly thick, flattened round wires 32, to be used for the same purposes as the bands, each group taking up about the same width as one of the sheet metal bands used heretofore. The wires 32 have their front and rear end portions bent upwardly like the end portions 27 of wires 25 and have their extremities looped and clinched onto top frame 28. The other frame 30 is also welded to the outer flat side of the upwardly bent end portions of wires 32, as indicated in Fig. 4, like the end portions 27 of wires 25. The wires 32 are generally rectangular in section, with their major dimension parallel to the wall of the basket to avoid any impression of too much bulk, despite the size of these wires. The wires 32 are flat on three sides as indicated at 33, and convex on the fourth side, as indicated at 34, and have their convex side 34 inward so as to have point contact with the outer side of the longitudinally extending wires 24 and permit easily spot-welding these wires together at all of the intersection points, as indicated at 35, by resistance welding, without any special forming of any of the parts, such as was required heretofore with the sheet bands, which, as stated before, required the provision of special weld projections struck therefrom to permit welding the bands to the wires. With that other construction, it was practical to provide only a relatively few such weld projections and, as stated before, it was not uncommon for some of the widely spaced welds to break, and, as a result, the bands became so loose that the basket was no longer supported properly and would rattle badly and get bent and require replacement. However, the present construction is much stronger, because with four wires 32 in a group and nine wires 24 in the bottom of the basket it is a relatively simple matter to provide thirty-six closely spaced good strong welds at the thirty-six intersection points, each wire to wire weld being at least as strong as, if not stronger than, any one of the welds made onto the sheet metal projection in the above described earlier construction. The present construction is also of advantage because the narrow elongated openings 36 defined between these wires 32 above and below the frame 30 are the equivalent of slots, so that the brackets 13, previously mentioned, which are adapted to be fastened onto the back of the basket, each by means of a bolt 37 entered through a center hole in a flanged washer 38 and through a registering center hole in the attaching end portion 39 of the bracket 13, can be adjusted up or down on the back of the basket for a nice fit of the basket on the handlebar, the bolt 37 when loosened being movable up or down in the opening 36, and the parallel flanges 40 on the edges of the washer 38 being slidable freely along the outside of the outer wires 32 whenever the bolt 37 is loosened. The nuts 41 on the bolts 37, as best appears in Fig. 6, are held against turning by engagement with the longitudinal flanges 42 on the channel-shaped attaching end portions 39 of the brackets 13, so that a screw driver is sufficient for adjusting the brackets. Having the wide flat side of the wires 32 outermost is advantageous, because they therby afford a good flat base onto which to clamp the attaching end portions of brackets 13 when the bolts 37 are tightened.

The clips 23, previously mentioned, are generally C-shaped and of molded rubber formed to tightly embrace the groups of wires 32 between any two neighboring transversely extending wires 24 in the bottom of the basket, each clip having thereon a pair of closely spaced downwardly projecting perforated ears or lugs 43 integral with the ends of the C to receive the associated bolt 22 to fasten the end of the supporting arm 17 to the clip between the lugs, as shown in Fig. 11. The compressibility and resilience of the rubber in the lugs 43, incidentally, gives the same effect as a lock washer to resist any tendency for the nut on bolt 22 to loosen. The flexibility of the lugs 43 is of advantage in allowing the arms 17 to extend downwardly from the clips at any angle of sidewise inclination relative to the bottom of the basket. These clips obviate the necessity of using other bolts to fasten the clips 23 to the bottom of the basket, the heads of which would surely project to some extent above the bottom of the basket and be apt to scratch or mar articles placed in the basket. There are, therefore, also no such bolts apt to get loose and drop out, leaving the basket without some much needed support. However, the rubber clips 23 are of even greater benefit from the standpoint of providing a shock-absorbing and vibration and sound absorbing type of connection between the supporting arms 17 and the bottom of the basket. Therefore, there is bound to be much less rattling of the basket connected with the running of a bicycle equipped with my improved basket. The clips 23 obviously may, as indicated by the dotted line showing in Fig. 2, be shifted from one location to another farther forward or rearward depending upon the needs of a particular bicycle, or when the raising or lowering of the handlebar, after the basket is applied, necessitates an alteration in the setting of the arms 17 relative to the bottom of the basket.

It is believed that the foregoing description conveys a good understanding of the objects and advantages of my invention. The appended claims have been drawn to cover all legitimate modifications and adaptations.

I claim:

1. A bicycle basket formed of wire and comprising a bottom wall including horizontally spaced parallel wires, and other walls including a rear wall extending upwardly from said bottom wall and including vertically spaced parallel wires parallel with the first wires, a plurality of wires in the bottom wall secured in transverse relation to the first mentioned horizontally spaced wires and having upwardly bent rear end portions in closely spaced parallel relation secured in transverse abutting relation to the second mentioned vertically spaced wires of the rear wall, and means for securing the basket to the handlebar of a bicycle including means adapted to be adjustably secured to the rear wall which means includes a fastening bolt extending through the rear wall in the small space between two of the closely spaced upwardly bent rear end portions and adapted to be shifted up and down relative to said end portions and tightened relative to said rear wall in a selected position of adjustment of said handlebar securing means.

2. A bicycle basket formed of wire and comprising a bottom wall including horizontally spaced parallel wires, and other walls including a rear wall extending upwardly from said bottom wall and including vertically spaced parallel wires parallel with the first wires, a plurality of closely spaced parallel wires in the bottom wall secured in transverse relation to the first mentioned horizontally spaced wires and having upwardly bent rear end portions secured in transverse abutting relation to the second mentioned vertically spaced wires of the rear wall, and means for securing the basket by means of its bottom wall to a bicycle including a member adapted to be shifted forwardly and rearwardly relative to said closely spaced parallel wires and having means for securing the same to said bottom wall in a selected position of adjustment of said member.

3. A bicycle basket formed of wire and comprising a bottom wall including horizontally spaced parallel wires, and other walls including a rear wall extending upwardly from said bottom wall and including vertically spaced parallel wires parallel with the first wires, a plurality of closely spaced parallel wires in the bottom wall secured in transverse relation to the first mentioned horizontally spaced wires and having upwardly bent rear end portions in closely spaced parallel relation secured in transverse abutting relation to the second mentioned vertically spaced wires of the rear wall, means for securing the basket to the handlebar of a bicycle including means adapted to be adjustably secured to the rear wall which means includes a fastening bolt extending through the rear wall in the small space between two of the closely spaced upwardly bent rear end portions and adapted to be shifted up and down relative to said end portions and tightened relative to said rear wall in a selected position of adjustment of said handlebar securing means, and means for securing the basket by means of its bottom wall to a bicycle including a member adapted to be shifted forwardly and rearwardly relative to said closely spaced parallel wires and having means for securing the same to said bottom wall in a selected position of adjustment of said member.

4. A bicycle basket formed of wire and comprising a bottom wall including horizontally spaced parallel wires, and other walls including a rear wall extending upwardly from said bottom wall and including vertically spaced parallel wires parallel with the first wires, a plurality of wires in the bottom wall secured in transverse relation to the first mentioned horizontally spaced wires and having upwardly bent rear end portions in closely spaced parallel relation secured in transverse abutting relation to the second mentioned vertically spaced wires of the rear wall, and means for securing the basket to the handlebar of a bicycle including means adapted to be adjustably secured to the rear wall which means includes a perforated washer slidably engaging said closely spaced end portions on the inside of said rear wall and having a projection abutting at least one of said end portions to prevent rotation of said washer, and a fastening bolt extending through the perforation in said washer and through the rear wall in the small space between two of the closely spaced upwardly bent rear end portions and adapted to be shifted up and down relative to said end portions and tightened to clamp said handlebar securing means against the outside of said rear wall in a selected position of adjustment.

5. A bicycle basket formed of wire and comprising a bottom wall including horizontally spaced parallel wires, and other walls including a rear wall extending upwardly from said bottom wall and including vertically spaced parallel wires parallel with the first wires, a plurality of closely spaced parallel wires in the bottom wall secured in transverse relation to the first mentioned horizontally spaced wires and having upwardly bent rear end portions secured in transverse abutting relation to the second mentioned vertically spaced wires of the rear wall, and means for securing the basket by means of its bottom wall to a bicycle including an attaching member of generally rectangular form the dimensions of which permit it to be inserted between any two of the first mentioned horizontally spaced wires whereby it may be shifted in steps forwardly and rearwardly relative to said closely spaced parallel wires and having means for securing the member to said wires in a selected position of its adjustment.

6. A structure as set forth in claim 5 wherein said attaching member is of resilient sound-deadening material and generally C-shaped in longitudinal vertical section and adapted to closely embrace the group of closely spaced parallel wires, the ends of said C having downwardly projecting spaced portions adapted to be drawn toward each other to secure the member to said wires, the said securing means comprising a bolt entered through registering openings provided in said downwardly projecting portions and adapted to secure said member to another member, said means for securing the basket by its bottom wall to the bicycle including an elongated reach member fastened at its one end by said bolt and adapted to be secured at its other end to the bicycle.

7. A bicycle basket formed of wire and comprising a top frame, a bottom wall including horizontally spaced parallel wires, and other walls including front and rear walls both of which extend upwardly from the bottom wall and are secured to the frame and include vertically spaced parallel wires parallel with the first wires, a plurality of closely spaced parallel wires in the bottom wall secured in transverse relation to the first mentioned horizontally spaced wires and having upwardly bent front and rear end portions secured at their extremities at the top frame and secured in transverse abutting relation to the second mentioned vertically spaced wires in the front and rear walls, and means for securing the basket by means of its bottom wall to a bicycle including a member adapted to be shifted forwardly and rearwardly relative to said closely spaced parallel wires and having means for securing the same to said bottom wall in a selected position of adjustment of said member.

8. A bicycle basket formed of wire and comprising a top frame, a bottom wall including horizontally spaced parallel wires, and other walls including front and rear walls both of which extend upwardly from the bottom wall and are secured to the frame and include vertically spaced parallel wires parallel with the first wires, a plurality of closely spaced parallel wires in the bottom wall secured in transverse relation to the first mentioned horizontally spaced wires and having upwardly bent front and rear end portions secured at their extremities to the top frame and secured in transverse abutting relation to the second mentioned vertically spaced wires in the front and rear walls, the upwardly bent rear end portions of said closely spaced wires being substantially parallel and in closely spaced relation, and means for securing the basket to the handlebar of a bicycle including means adapted to be adjustably secured to the rear wall which means includes a fastening bolt extending through the rear wall in the small space between two of the closely spaced upwardly bent rear end portions and adapted to be shifted up and down relative to said end portions and tightened relative to said rear wall in a selected position of adjustment of said handlebar securing means.

9. A bicycle basket formed of wire and comprising a top frame, a bottom wall including horizontally spaced parallel wires, and other walls including front and rear walls both of which extend upwardly from the bottom wall and are secured to the frame and include vertically spaced parallel wires parallel with the first wires, a plurality of closely spaced parallel wires in the bottom wall secured in transverse relation to the first mentioned horizontally spaced wires and having upwardly bent front and rear end portions secured at their extremities to the top frame and secured in transverse abutting relation to the second mentioned vertically spaced wires in the front and rear walls, the upwardly bent rear end portions of said closely spaced wires being substantially parallel and in closely spaced relation, and means for securing the basket to the handlebar of a bicycle including means adapted to be adjustably secured to the rear wall which means includes a perforated washer slidably engaging said closely spaced end portions on the inside of said rear wall and having a projection abutting at least one of said end portions to prevent rotation of said washer, and a fastening bolt extending through the perforation in said washer and through the rear wall in the small space between two of the closely spaced upwardly bent rear end portions and adapted to be shifted up and down relative to said end portions and tightened to clamp said handlebar securing means against the outside of said rear wall in a selected position of adjustment.

10. A bicycle basket formed of wire and comprising a top frame, a bottom wall including horizontally spaced parallel wires, and other walls including front and rear walls both of which extend upwardly from the bottom wall and are secured to the frame and include vertically spaced parallel wires parallel with the first wires, a plurality of closely spaced parallel wires in the bottom wall secured in transverse relation to the first mentioned horizontally spaced wires and having upwardly bent front and rear end portions secured at their extremities to the top frame and secured in transverse abutting relation to the second mentioned vertically spaced wires in the front and rear walls, and means for securing the basket by means of its bottom wall to a bicycle including an attaching member of generally rectangular form, the dimensions of which permit it to be inserted between any two of the first mentioned horizontally spaced wires whereby it may be shifted in steps forwardly and rearwardly relative to said closely spaced parallel wires and having means for securing the member to said wires in a selected position of its adjustment.

11. A structure as set forth in claim 10 wherein said attaching member is of resilient sound-deadening material and generally C-shaped in longitudinal vertical section and adapted to closely embrace the group of closely spaced parallel wires, the ends of said C having downwardly projecting spaced portions adapted to be drawn toward each other to secure the member to said wires, the said securing means comprising a bolt entered through registering openings provided in said downwardly projecting portions and adapted to secure said member to another member, said means for securing the basket by its bottom wall to the bicycle including an elongated reach member fastened at its one end by said bolt and adapted to be secured at its other end to the bicycle.

12. In a rectangular wire basket construction comprising a top frame, a bottom and opposed end and opposed front and rear walls secured to the top frame, said basket being of square mesh wire construction formed by a set of longitudinally extending spaced parallel wires and a set of abutting, transversely extending spaced parallel wires secured to the first named wires at the crossings and secured at their extremities to said top frame, the improvement comprising the provision of a wide band extending crosswise of said basket adapted to serve as a frame member for attachment of the basket to a bicycle, said band including a plurality of closely spaced substantially parallel wires of larger size than the aforesaid mesh forming wires abutting and integrally connected with one set of said mesh-forming wires at all of the crossings.

13. A wire basket construction as set forth in claim 12, wherein the last named wires of said band are disposed on the outside of the basket and are of flattened form having their major dimension parallel to the walls of the basket.

14. A wire basket construction as set forth in claim 12, wherein the last named wires of said band are disposed on the outside of the basket and are of flattened form having their major dimension parallel to the walls of the basket, said band wires having a convex inside face to facilitate spot-welding to the mesh-forming wires of the basket, and the latter being of circular cross-section to facilitate the spot-welding thereto.

15. A bicycle basket comprising a wire basket body having an upright rear wall adapted to be fastened to a bicycle handlebar and including vertically spaced parallel wires, a plurality of closely spaced parallel wires in transverse abutting relation to said vertically spaced wires and secured thereto at all of the crossings, and means for securing the basket to the handlebar of a bicycle including means adapted to be adjustably secured to the rear wall which means includes a fastening bolt extending through the rear wall in the small space between two of the closely spaced wires and adapted to be shifted up and down relative thereto and tightened relative to said rear wall in a selected position of adjustment of said handlebar securing means.

16. A bicycle basket comprising a wire basket body having an upright rear wall adapted to be fastened to a bicycle handlebar and including vertically spaced parallel wires, a plurality of closely spaced parallel wires in transverse abutting relation to said vertically spaced wires and secured thereto at all of the crossings, and means for securing the basket to the handlebar of a bicycle including means adapted to be adjustably secured to the rear wall which means includes a perforated washer slidably engaging said closely spaced wires on the inside of said rear wall and having a projection abutting at least one of said wires to prevent rotation of said washer, and a fastening bolt extending through the perforation in said washer and through the rear wall in the small space between two of the closely spaced wires and adapted to be shifted up and down relative thereto and tightened to clamp said handlebar securing means against the outside of said rear wall in a selected position of adjustment.

17. In a bicycle basket comprising a wire mesh body having a top frame, a bottom wall and upwardly extending side walls secured to the top frame, and an attaching band extending crosswise of the bottom wall and upwardly on said side walls and secured at the ends to said top frame, the improvement comprising the provision of an attaching C-clip of flexible and resilient sound deadening material closely embracing said band and having the ends of the C disposed on the outer side of the band and provided with outwardly projecting portions disposed in spaced relation adapted to be drawn toward each other to secure the clip to said band, a bolt entered through registering holes provided in said projections, which when tightened draws said projections together, and a basket supporting member carried on the bicycle having said bolt entered therethrough to fasten said clip thereto.

E. LUCIAN DENNIS.

REFERENCES CITED

The following references are of record in the file of this patent:

UNITED STATES PATENTS

| Number | Name | Date |
| --- | --- | --- |
| 971,378 | Hewitt | Sept. 27, 1910 |
| 1,205,769 | McGill | Nov. 21, 1916 |
| 2,327,537 | Lyman | Aug. 24, 1943 |
| 2,469,776 | McGee | May 10, 1949 |
| 2,498,446 | Pawsat | Feb. 21, 1950 |